United States Patent [19]

Hodgkinson

[11] 3,902,838

[45] Sept. 2, 1975

[54] FLUIDISED BED COMBUSTION

[75] Inventor: Norman Hodgkinson, Cheltenham, England

[73] Assignee: Coal Industry (Patents) Limited, London, England

[22] Filed: Apr. 9, 1974

[21] Appl. No.: 459,654

[30] Foreign Application Priority Data
June 25, 1973  United Kingdom............... 30025/73

[52] U.S. Cl. .................................................. 431/7
[51] Int. Cl. ............................................... F23d 3/40
[58] Field of Search ............. 431/7, 170, 2; 432/15, 432/58; 110/28 J

[56] References Cited
UNITED STATES PATENTS

| | | | |
|---|---|---|---|
| 2,185,549 | 1/1940 | Gault | 431/7 |
| 3,515,381 | 6/1970 | Foch | 432/15 |
| 3,617,037 | 11/1971 | Foch | 432/15 |
| 3,663,149 | 5/1972 | Heagler | 431/2 |

Primary Examiner—Edward G. Favors
Attorney, Agent, or Firm—Stevens, Davis, Miller & Mosher

[57] ABSTRACT

A glutinous or highly viscous substance is burnt within a hot fluidised bed of inert material by first coating a particulate material with the substance and then introducing the coated particles into the bed for combustion. After the coating has been combusted the particles can be removed from the bed for further coating with the substance. This method of combustion affords an effective way of dealing with glutinous or highly viscous substances, e.g. waste materials, which otherwise would be unsuitable for burning in a fluidised bed.

7 Claims, No Drawings

FLUIDISED BED COMBUSTION

This invention concerns fluidised bed combustion.

In particular, it concerns such combustion of a glutinous or highly viscous substance. Many different types of materials may be combusted employing a fluidised bed of inert or catalytic material, maintained at a temperature conducive to the combustion of those materials. For example, fossil fuels, such as coal, oil or gas and waste materials either in solid, sludge or slurry form can be burnt within such a bed. In this regard, and depending on the nature of the combustible material, delivery thereof into or onto the bed has been found to be of no great difficulty, mainly because of the generally flowable nature of the material. For example, in the case of oil or gas suitable feed nozzles or injectors can be employed with relative ease and dispersion through the bed achieved. In the case of solid or semi-solid materials their size is made compatible with the bed material particle size that with suitable dispersal feed arrangements the material can be burnt within the fluidised bed. One important factor when dealing with solid or semi-solid, i.e. sludge or slurry, materials, is to ensure such compatibility, that is, if the combustible material is of a greater density than the bed material the combustible material is likely to sink to the bottom of the bed and can then cause partial defluidisation of the bed by blocking the fluidising medium inlets or by sintering into large pieces which will not fluidise. If allowed to continue this could effect complete defluidisation of the bed.

It has been found that a glutinous or highly viscous substance upon introduction into or onto a fluidised bed for combustion tends to sink to the bottom of the bed or alternatively, agglomerates and then sinks. As has been indicated, such sinking has an adverse effect on the fluidisation of the bed.

An object of the invention is to provide a method of burning a glutinous or highly viscous substance without the adverse effect hereinbefore mentioned.

Accordingly, the invention provides a method of burning a glutinous or highly viscous substance in a fluidised bed of inert or catalytic material, the method comprising the steps of coating particulate material with the said substance, and introducing the material so coated into the bed to combust the coating.

Conveniently, subsequent to combustion of the substance, the particulate material is withdrawn from the bed and recoated with further substance for combustion in the bed.

In order that combustion of the substance may be effected the temperature of the bed is maintained at a level conducive to such combustion: this will depend on the type of substance to be burnt but it is envisaged that the temperature of the bed should be in the region of 700°–950°C. The initial heat input to the bed to attain the required temperature may be generated either by the combustion of a fuel therewithin or the passage of hot gases therethrough. In the case of the latter being employed, the hot gases are utilised as the fluidising medium for the bed and they themselves may be derived from a fluidised bed combustion system, i.e. the exhaust gases therefrom.

The bed material may be inert or catalytic as already indicated and of a fluidisable density. Inert material which is suitable is ash, derived from the combustion of a fossil fuel, e.g. coal, refractory material, or sand. The particulate material which, in the method of the invention, is to be coated, may be the solid waste combustion product, i.e. clinker from boilers. Alternatively, it may be gravel or spheres of suitable solid material. Preferably the particulate material is inert, but it may be of a reactive nature e.g. catalytic or solid fuel i.e. coal.

The glutinous or highly viscous substance may, for example, be the residue from oil refinery processing, waste resulting from the cleaning of oil tanks and the like waste or waste plastics material.

One example of the present invention is described below.

EXAMPLE

A glutinous substance, in this case, residue from oil refinery processing, is coated onto particles of clinker derived from combustion of solid fuel. The size of the particulate material is compatible with the maximum size of the bed material e.g. 3/16 inch. The coated particles are introduced into a fluidised bed of inert material, e.g. ash, maintained at a temperature in the region of 900°C by the combustion of fuel in the bed.

Subjected to the heat of the bed the coating of the particles is burnt off within the bed. The particles free of their coating are removed from the bed and are recycled for further coating with the substance and subsequent re-introduction into the bed. The cycle may be repeated any number of times depending on the total amount of the substance to be disposed of.

The invention affords a method of burning whereby glutinous or highly viscous substances may readily be burnt in a fluidised bed without direct introduction into the bed, thereby obviating the difficulty of agglomeration attendant upon such introduction, the particulate material acting as a carrier for the substance.

I claim:

1. A method of burning a combustible substance including the steps of fluidising a bed of inert material, maintaining the bed at a temperature conducive to the combustion of the substance, coating a particulate material with the substance, introducing the coated particulate material into the bed, and burning the substance coating.

2. A method according to claim 1 in which the particulate material is withdrawn from the bed subsequent to the combustion of the substance coating, and the withdrawn particulate material is recoated with further substance for combustion in the bed.

3. A method according to claim 1 in which the particulate material is inert.

4. A method according to claim 1 in which the particulate material is catalytic.

5. A method according to claim 1 in which the particulate material is coal.

6. A method according to claim 1 in which fuel is introduced into the bed, the fuel is burnt within the bed to maintain the bed at the temperature conducive to the combustion of the combustible substance.

7. A method according to claim 6 in which the fuel is the particulate material.

* * * * *